United States Patent
Ikuro et al.

(10) Patent No.: US 9,272,699 B2
(45) Date of Patent: Mar. 1, 2016

(54) TORQUE CONTROL DEVICE OF DRIVING SOURCE

(75) Inventors: Ayae Ikuro, Wako (JP); Takahiro Eguchi, Wako (JP); Takeshi Kurata, Wako (JP); Atsushi Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 14/004,268

(22) PCT Filed: Mar. 9, 2012

(86) PCT No.: PCT/JP2012/056117
§ 371 (c)(1),
(2), (4) Date: Sep. 10, 2013

(87) PCT Pub. No.: WO2012/124626
PCT Pub. Date: Sep. 20, 2012

(65) Prior Publication Data
US 2013/0345020 A1 Dec. 26, 2013

(30) Foreign Application Priority Data
Mar. 12, 2011 (JP) .................................. 2011-054860

(51) Int. Cl.
*B60W 10/06* (2006.01)
*B60W 10/107* (2012.01)
(Continued)

(52) U.S. Cl.
CPC .............. *B60W 10/107* (2013.01); *B60K 6/485* (2013.01); *B60K 6/543* (2013.01); *B60W 10/04* (2013.01); *B60W 10/06* (2013.01); *B60W 10/08* (2013.01); *B60W 20/00* (2013.01); *B60W 30/1846* (2013.01); *F16H 63/50* (2013.01); *B60W 2510/1005* (2013.01); *B60W 2710/0666* (2013.01); *B60W 2710/083* (2013.01); *B60W 2710/1022* (2013.01); *F16D 2500/50293* (2013.01); *F16D 2500/50296* (2013.01);
(Continued)

(58) Field of Classification Search
None
See application file for complete search history.

(56) References Cited

U.S. PATENT DOCUMENTS
6,146,308 A * 11/2000 Taniguchi et al. .............. 477/48

FOREIGN PATENT DOCUMENTS
JP 11-091410 A 4/1999
JP 2008-232032 A 10/2008
JP 2010-159722 A 7/2010

OTHER PUBLICATIONS
International Search Report dated Apr. 3, 2012 corresponding to International Patent Application No. PCT/JP2012/056117 and English translation thereof.
(Continued)

*Primary Examiner* — Erin D Bishop
(74) *Attorney, Agent, or Firm* — Squire Patton Boggs (US) LLP

(57) ABSTRACT

In a driving device of a vehicle provided with driving sources, an input shaft rotatable due to driving force of the driving sources, a continuously variable transmission mechanism that shifts the rotation of the input shaft to be transmitted to an output shaft, and a start clutch for switching presence/absence of driving force transmission from the output shaft to a downstream side; when a ratio of the continuously variable transmission is on a lower ratio side than a predetermined threshold value, the output torque control means for controlling the output torque of the driving sources perform control to restrict the upper limit of output torque of the driving sources to a value smaller than the upper limit when a ratio is on the higher ratio side than the threshold value.

7 Claims, 3 Drawing Sheets

(51) Int. Cl.
    *B60K 6/485*     (2007.10)
    *B60K 6/543*     (2007.10)
    *B60W 10/08*     (2006.01)
    *B60W 20/00*     (2006.01)
    *B60W 30/184*    (2012.01)
    *F16H 63/50*     (2006.01)
    *B60W 10/04*     (2006.01)
    *F16H 61/662*    (2006.01)

(52) U.S. Cl.
    CPC . *F16D2500/70458* (2013.01); *F16H 61/66259* (2013.01); *F16H 2063/508* (2013.01); *Y02T 10/6226* (2013.01); *Y02T 10/6286* (2013.01); *Y10T 477/6203* (2015.01)

(56) References Cited

OTHER PUBLICATIONS

Japanese Notice of Reasons for Rejection application No. P2013-504705 dated Oct. 8, 2013.

* cited by examiner

TORQUE CONTROL DEVICE OF DRIVING SOURCE

TECHNICAL FIELD

The present invention relates to a torque control device of driving source that is composed to control the load of a start clutch by controlling the output torque of the driving source, in a vehicle driving device provided with driving sources along with a continuously variable transmission mechanism and a start clutch arranged downstream thereof.

BACKGROUND ART

An automatic transmission installed in a vehicle includes an input shaft to which driving force of a driving source such as an engine or a motor is transmitted, and a belt-type continuously variable transmission mechanism (CVT) installed between the input shaft and an output shaft. In the automatic transmission provided with such the continuously variable transmission mechanism, a desired gear ratio is obtained by shifting the rotation of the input shaft with the continuously variable transmission mechanism and transmitting it to the output shaft. And, such an automatic transmission includes a start clutch arranged between the output shaft of the continuously variable transmission and a rotating shaft (or a counter shaft) installed downstream thereof, for switching presence/absence of driving force transmission to the downstream side from the output shaft when a vehicle starts.

In a vehicle equipped with the above-described continuously variable transmission mechanism including the start clutch, judders (or vibrations) may occur in the start clutch due to the input of excessive torque to the continuously variable transmission mechanism from the driving source. Therefore, measures for suppressing the judders of the start clutch are necessary. On the other hand, it is also important to ensure the power performance of vehicle by allowing to transmit the torque of driving source to the drive wheels as effectively as possible. Therefore, it is desirable to attempt, by appropriately controlling the transmission torque of start clutch, to ensure both judder toughness (or anti-vibration performance) by suppressing the lifetime cumulative load of start clutch and power performance of the vehicle.

It is noted that as a conventional technology of transmission torque control of clutch related to the present application, for example, Patent Document 1 discloses a control device for reduction control of engine torque so that the transmission clutch for each gear position of an automatic transmission can not slip. This control device calculates torque limit values that the engine can output without slipping the transmission clutch (or the frictional engagement member) for each gear position of the automatic transmission, setting the engaging state of lockup clutch, the hydraulic oil temperature of automatic transmission, the engine rotational speed, and the shifting state of automatic transmission as parameters. This enables to minimize the reduction amount of engine torque, while certainly preventing slipping of the transmission clutch for each gear position.

Since the control device described in this Patent Document 1 performs control to prevent slipping of the transmission clutch in each gear position of a stepped automatic transmission, the control device has mapped slip prevention torque limit values of clutch for each gear position so as to restrict a requested torque when the said requested torque exceeds the said torque limit values. And, also in the engine torque control of a continuously variable transmission mechanism, while such control as in Patent Document 1 is already used for improving starting performance of product, setting oil temperature and clutch differential rotation as parameters, the problem of the present invention is to suppress the lifetime cumulative load of start clutch within a target, by appropriately controlling the input torque of start clutch accompanying the continuously variable transmission mechanism. Therefore, even if the control described in Patent Document 1 is applied as it is, since the load applied to the start clutch accompanying the continuously variable transmission mechanism cannot be controlled appropriately when the vehicle starts or during its subsequent running, it will not be a means to resolve the problem of the present invention.

CITATION LIST

Patent Document

Patent Document 1

Japanese Patent Application Publication No. 2010-159722

SUMMARY OF THE INVENTION

Problems to be Solved by the Invention

In view of the above-described problems, the present invention has an object to achieve both the improvement in judder toughness of a start clutch and improvement in power performance of vehicle, by a simple control, in a vehicle equipped with the driving device including a continuously variable transmission mechanism with the start clutch.

Means for Solving the Problems

The present invention for solving the above-described problems is a torque control device of driving sources including: a vehicle driving device provided with the driving sources (1, 2), an input shaft (7) that rotates due to the driving force of the driving sources (1, 2), a continuously variable transmission mechanism (30) to shift the rotation of the input shaft (7) to transmit to the output shaft (10), and a start clutch (11) arranged between the output shaft (10) and a rotating shaft (5) installed downstream thereof, for switching presence/absence of driving force transmission from the output shaft (10) to the downstream side; and the torque control device of driving sources further including ratio detection means (44, 45) for detecting the ratio (R) of a continuously variable transmission (30), and output torque control means (50, 51, 52) for controlling the output torque of driving sources (1, 2); wherein, when the ratio (R) of the continuously variable transmission (30) detected by the ratio detection means (44, 45) is on the lower ratio side than the predetermined threshold value (R1), the output torque control means (50, 51, 52) perform control to restrict the upper limit (TQmax) of output torque of the driving sources (1, 2) to the 2nd value (TQ2) that is smaller than the 1st value (TQ1) that is the upper limit (TQmax) when the ratio (R) is on the higher ratio side than the threshold value (R1).

The torque control device of driving source according to the present invention enables to prevent the load applied to the start clutch from exceeding a predetermined amount when the ratio of the continuously variable transmission is on a lower ratio side than the threshold value, by performing control to restrict the upper limit of output torque of driving sources to a value smaller than the upper limit when the ratio is on a higher ratio side than the threshold value, when the ratio of the continuously variable transmission detected by the ration detection means is on a lower ration side than the predetermined threshold value. Thus, by suppressing the input torque of the start clutch within target value, the lifetime cumulative load of the start clutch can be kept low, and judder toughness (or anti-vibration performance) of the start clutch can be ensured. On the other hand, when the ratio of the continuously variable transmission is on a higher ratio side than a threshold value, by releasing the limit of the torque input to the start clutch from driving sources, the power performance of vehicle can be improved as the driving force of driving sources can be used effectively. Due to this, both the improvement in judder toughness of the start clutch and the improvement in power performance of vehicle can be achieved.

Further, in the above-described torque control device of driving source, when the ratio (R) of the continuously variable transmission (30) exceeds the threshold value (R1) and changes from a low ratio side to a high ratio side, the output torque control means (50, 51, 52) perform control to restore the upper limit (TQmax) of output torque of the driving sources (1, 2) from the 2nd value (TQ2) to the 1st value (TQ1), and at that time, the upper limit (TQmax) of the said output torque should be gradually changed to be restored.

This configuration enables to effectively prevent the occurrence of shocks in the start clutch or the occurrence of a jerky feeling in the running state of vehicle, by gradually changing the upper limit of output torque of driving sources to be restored.

Also, in the above-described torque control device of driving source, the 2nd value (TQ2) may be a value that is determined based on a preset maximum torque to be input to the output shaft (10) or the start clutch (11). Here, the preset maximum torque to be input to the output shaft or the start clutch is the maximum allowable torque that is set based on the strength of parts that constitute the output shaft and the start clutch. This configuration enables to prevent a decrease in the power performance of vehicle, as the limit of output torque of driving sources can be kept to the required minimum by setting the upper limit of output torque of driving sources based on the maximum torque of parts of output shaft side.

Further, in the above-described torque control device of driving source, the threshold value (R1) of the ratio (R) may be a value that is determined based on the ratio of the 1st value (TQ1) and the 2nd value (TQ2), and the value (R0) of the lowest ratio side of the ratio (R). According to this configuration, the threshold value of ratio is to be set based on the 1st value that is the upper limit of output torque of driving sources at normal time and the 2nd value that is the upper limit of output torque of driving sources when performing restriction of output torque, thereby being capable of achieving an optimum value as the said threshold value.

Also, in the above-described torque control device of driving source, the threshold value (R1) of the ratio (R) of the continuously variable transmission (30) should be set to values in the way that the value (Rh) when the ratio (R) exceeds the threshold value (R1) to change from a low ratio side to a high ratio side and the value (R1b) when changing from a high ratio side to a low ratio side are different from each other. Adding hysteresis to the threshold value of the ratio of the continuously variable transmission mechanism in this manner enables to prevent the hunting phenomenon in which the upper limit of output torque of driving sources switches frequently due to sudden changes of ratio of the continuously variable transmission mechanism. It is noted that the above reference characters written in parentheses represent, by way of example, reference characters of components of embodiments to be described herein later.

Effects of the Invention

The torque control device of driving source according to the present invention enables to achieve both the improvement in judder toughness of the start clutch and the improvement in power performance of vehicle, by the simple control of changing the output torque of driving sources input to the start clutch depending on the ratio of the continuously variable transmission, in a vehicle provided with a driving device including the continuously variable transmission mechanism with the start clutch.

EMBODIMENT OF THE INVENTION

Figure 1:
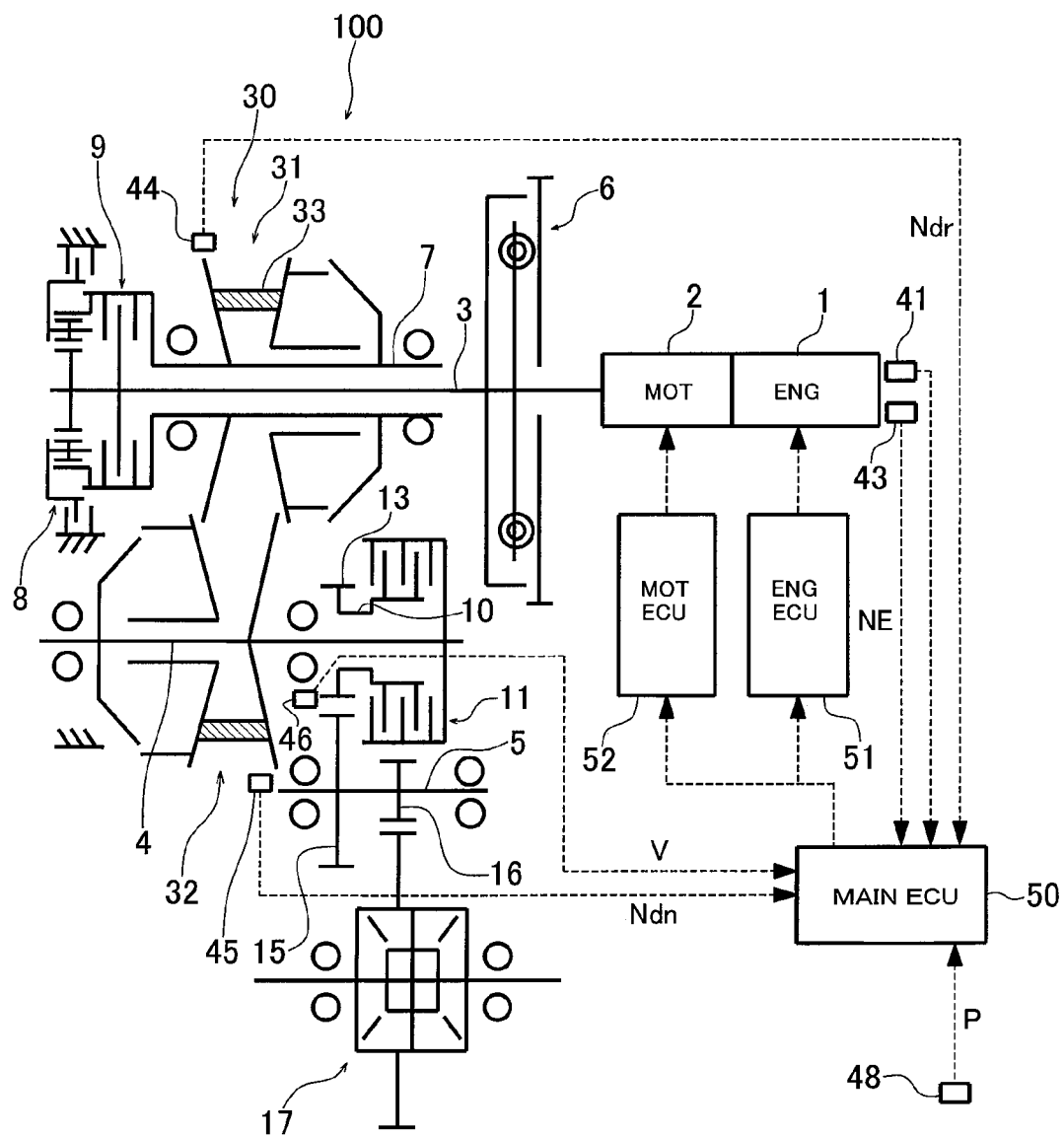
FIG. 1 is a schematic diagram showing a vehicle driving device provided with a torque control device of driving source in accordance with one embodiment of the present invention.

Hereinafter, an embodiment of the present invention will be described in detail with reference to the appending drawings. FIG. 1 is a schematic diagram showing a driving device 100 of vehicle provided with a torque control device of driving source in accordance with one embodiment of the present invention. The driving device 100 shown in the same diagram comprises a drive shaft (or an inner circumferential shaft) 3 for transmitting an output from an engine 1 and a motor 2 that are driving sources, a driven shaft (or an inner circumferential shaft) 4 installed in parallel at a predetermined distance with respect to the drive shaft 3, and a counter shaft 5 installed in parallel at a predetermined distance with respect to the drive shaft 3 and the driven shaft 4. A damper mechanism 6 for absorbing torque fluctuations transmitted from the engine 1 is provided on the drive shaft 3. In addition, an input shaft 7 (or an outer circumferential shaft) is arranged on an outer circumference side coaxially with the drive shaft 3, one end of which connects to the input shaft 7 via a forward-reverse switching mechanism 8 and a forward clutch 9. On the other hand, an output shaft (or an outer circumferential shaft) 10 is arranged on an outer circumference side coaxially with the driven shaft 4, one end of which driven shaft 4 connects to the output shaft 10 via a start clutch 11. An output gear 13 is provided on the output shaft 10, and the output gear 13 connects to a differential gear device 17 via intermediate gears 15, 16 on the counter shaft 5.

A belt-type continuously variable transmission mechanism (or CVT: Continuously Variable Transmission) 30 is installed between the input shaft 7 and the output shaft 10. The belt-type continuously variable transmission mechanism (hereinafter referred to as "CVT") 30 comprises a drive side pulley 31 rotatable together with the input shaft 7, a driven side pulley 32 rotatable together with the output shaft 10, and an endless transmission belt (or a metal V-belt) 33 looped between the drive side pulley 31 and the driven side pulley 32. In the CVT 30, by controlling oil pressure (or drive side pressure and driven side pressure) supplied to a cylinder chamber of the drive pulley 31 and a cylinder chamber of the driven pulley 32 with a hydraulic control device, none of which is shown in the figure, lateral pressure is exerted on the drive pulley 31 and the driven pulley 32, such that the transmission belt 33 does not slip. Furthermore, by performing control to adjust the drive side pressure and the driven side pressure while differentiating from each other, appropriately varying groove width of the drive pulley 31 and the driven pulley 32 so as to change winding diameter of the transmission belt 33, control is performed to continuously change ratio (or gear ratio) between the drive side pulley 31 and driven side pulley 32.

Further, in the start clutch 11 installed between the driven shaft 4 and the output shaft 10, transmission torque control is performed by controlling oil pressure supplied to the start clutch 11 with a hydraulic control device when vehicle starts. As a result, torque of driven shaft 4 side is transmitted to an output shaft 10 side at a ratio corresponding to an engaging state of the start clutch 11.

The driving device 100 of the present embodiment is configured to comprise the engine 1 and the motor 2 that are driving sources, the input shaft 7 that rotates by means of driving force of the engine 1 and the motor 2, the CVT 30 that shifts rotation of the input shaft 7 to be transmitted to the output shaft 10, the start clutch 11 arranged between the output shaft 10 and the counter shaft 5 installed downstream thereof, for switching presence/absence of driving force transmission from the output shaft 10 to a downstream side.

In the driving device 100 of the above-described configuration, when selection of a select lever that will be described later is in an in-gear state, rotational force transmitted to the drive shaft 3 from the engine 1 and the motor 2 is transmitted to the drive side pulley 31 via the forward clutch 9, and rotational force of the drive side pulley 31 is transmitted to the driven side pulley 32 via the transmission belt 33. Then, depending on depression of an accelerator pedal (not shown in the figure), rotational force of the driven side pulley 32 is transmitted to the output shaft 10 via the start clutch 11, and rotational force of the output shaft 10 is transmitted to left and right driving wheels (not shown in the figure) via the output gear 13, intermediate gears 15, 16 and the differential gear device 17.

The driving device 100 of the present embodiment comprises an electronic control unit (hereinafter, referred to as "Main ECU") 50 responsible for controlling driving sources consisting of the engine 1 and the motor 2 and a drive system such as the CVT 30. Each data of engine rotational speed Ne detected by an engine rotational speed sensor 41 and throttle valve aperture θ TH detected by a throttle aperture sensor 42 is input to the Main ECU 50. Data such as rotational speed Ndr of the input shaft 7 detected by an input shaft rotation sensor 44 installed in a vicinity of the drive side pulley 31, rotational speed Ndn of the driven shaft 4 detected by a driven shaft rotation sensor 45 installed in a vicinity of the driven side pulley 32, vehicle speed V detected by the output shaft rotation sensor 46 installed in a vicinity of the output shaft 10, and accelerator pedal aperture AP detected by an accelerator pedal aperture sensor 47 installed in a vicinity of an accelerator pedal (not shown in the figure) are also input to the main ECU 50. Further, although not shown in the figure, data detected by a coolant temperature sensor for detecting coolant temperature of the engine 1, by an intake air temperature sensor for detecting temperature (or intake air temperature) of air supplied to the engine 1, by a flow rate sensor for detecting air mass flow, and by an intake pipe internal pressure sensor for detecting absolute pressure in an intake pipe are also input to the main ECU 50.

Furthermore, values detected by a shift position sensor 48 for detecting a state of a select lever (not shown in the figure) of an automatic transmission is input to the main ECU 50. In a vehicle of the present embodiment, shift positions (or running ranges) such as Neutral (N), Parking (P), Drive (D), Reverse (R) and Low (L) can be selected for the select lever.

A shift position sensor 48 detects whether a state selected by the above-described select lever is in an in-gear state or a neutral state.

Moreover, the driving device 100 of the present embodiment comprises an engine ECU 51 for controlling driving force of the engine 1 and a motor ECU 52 for controlling driving force of the motor 2. The engine ECU 51 and the motor ECU 52 control driving force respectively of the engine 1 and the motor 2 based on commands of the main ECU 50. At that time, the engine ECU 51 calculates engine torque based on detected values of each of the above-described sensors input to the main ECU 50, and provides the engine 1 with engine torque command values based on results of the calculation. By controlling injection quantity or ignition timing based on the command values, output torque of the engine 1 can be controlled. Also, the motor ECU 52 calculates motor torque based on detected values of each of the above-described sensors input to the main ECU 50, and provides the motor 2 with motor torque command values based on results of the calculation. This enables to control output torque of the motor 2. The main ECU 50, the engine ECU 51 and the motor ECU 52 as described above function as output torque control means of a torque control device for controlling output torque of the engine 1 and the motor 2 that are driving sources.

Figure 2:
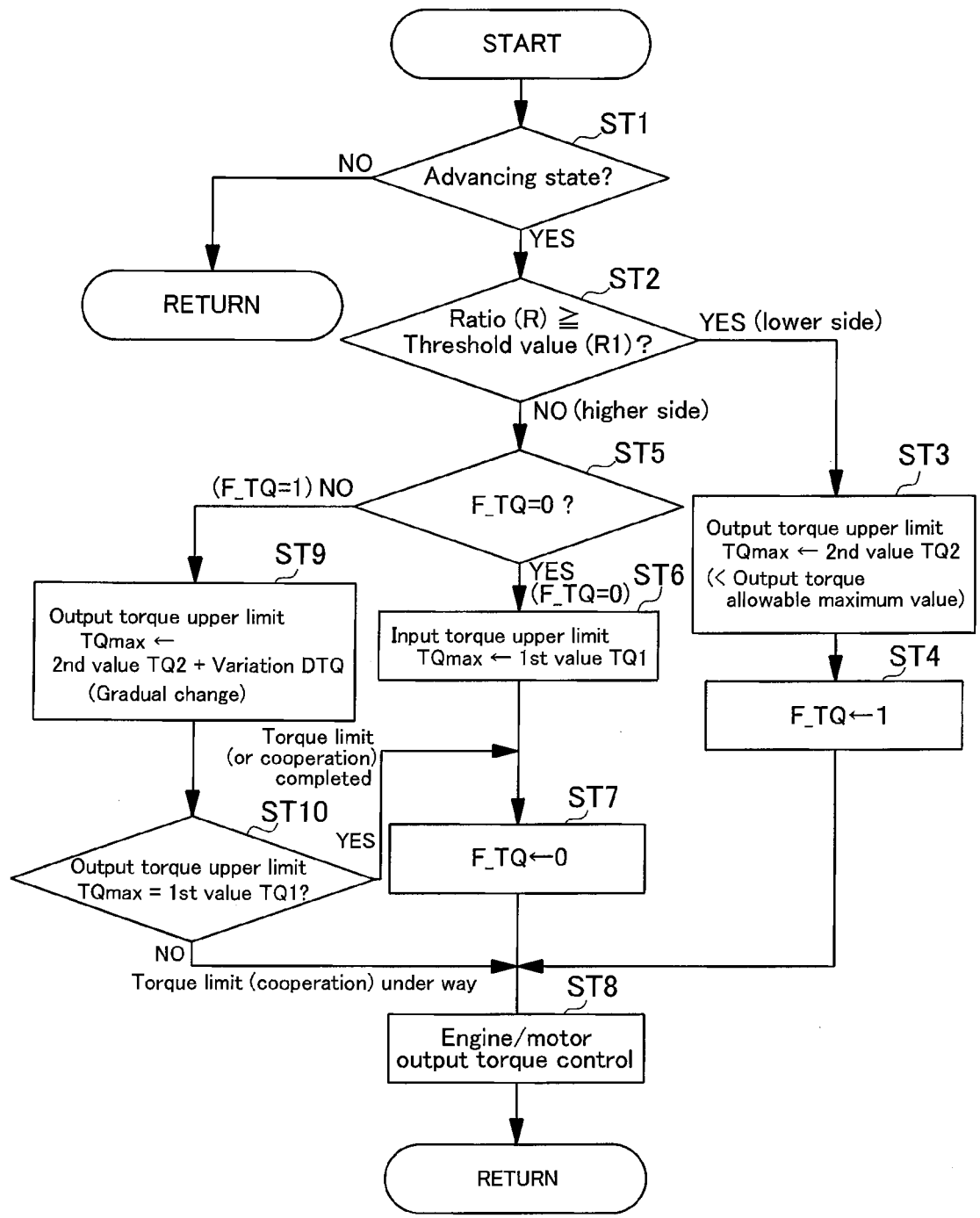
FIG. 2 is a flowchart showing a procedure of torque control of driving source.

Next, output torque control of the engine 1 and the motor 2 with the above-described output torque control means will be described in detail. FIG. 2 is a flowchart showing a procedure of output torque control of the engine 1 and the motor 2. In the control shown in the flowchart of FIG. 2, first, the main ECU 50 determines whether or not a vehicle is in advancing state based on a shift position detected by the shift position sensor 48 (Step ST1). Here, if the shift position is either in Drive (D) or Low (L) in which the vehicle is capable of advancing, the vehicle is determined to be in an advancing state, and if the shift position is in any of Neutral (N), Parking (P) and Reverse (R) other than Drive (D) and Low (L), the vehicle is determined to be not in an advancing state. As a result, if the vehicle is not in an advancing state (NO), the process ends as it is. On the other hand, if the vehicle is in an advancing state (YES), in continuation, a second step determines whether or not ratio R of the CVT 30 is equal to or more than predetermined threshold value R1 (R≥R1) (Step ST2). Here, ratio R of the CVT 30 is calculated as a ratio (R=Ndn/Ndr) between rotational speed Ndr of the input shaft 7 detected by the input shaft rotation sensor 44 and rotational speed Ndn of the driven shaft 4 detected by the driven shaft rotation sensor 45.

As a result, if ratio R of the CVT 30 is equal to or more than threshold value R1, in other words, if ratio R is on a lower ratio side than threshold value R1 (YES), the main ECU 50 issues appropriate commands to the engine ECU 51 or the motor ECU 52, thereby setting upper limit TQmax of output torque of the engine 1 and the motor 2 (=input torque of the CVT 30 and the start clutch 11; the same shall apply hereinafter) to 2nd value TQ2 (Step ST3), and setting torque limit execution flag to F_TQ←1 (Step ST4). Then, an eighth step performs output torque control of the engine 1 and the motor 2 within a range that does not exceed upper limit TQmax=TQ2 (Step ST8). Here, 2nd value TQ2 is a value smaller than the 1st value TQ1 that is upper limit when ratio R of the CVT 30 is on a higher ratio side than threshold value R1 (TQ2<TQ1), as will be described later. Also, the 2nd value TQ2 is a value that is determined based on allowable maximum value of an input torque that is set based on strength of component parts of the output shaft 10 and the start clutch 11, and is a value smaller than allowable maximum value of the input torque.

On the other hand, in the previous step ST2, if ratio R of the CVT 30 was less than threshold value R1, in other words, if ratio R is on a higher ratio side than threshold value R1 (NO), in continuation, a fifth step determines whether or not torque limit execution flag F_TQ is F_TQ=0 (or non-performance of torque limit) (Step ST5). As a result, if the torque limit execution flag is F_TQ=0 (YES), a sixth step sets upper limit TQmax of output torque of the engine 1 and the motor 2 to 1st value TQ1 (Step ST6), and a seventh step makes torque limit execution flag F_TQ←0 (Step ST7). Then, an eighth step performs output torque control of the engine 1 and the motor 2 within a range that does not exceed upper limit TQmax=TQ1 (Step ST8). On the other hand, in the previous step ST5, if torque limit execution flag was F_TQ=1 (NO), in other words, if torque limit was implemented, a ninth step sets upper limit TQmax of output torque of the engine 1 and the motor 2 to 2nd value TQ2+variation DTQ, and gradually changes upper limit TQmax from 2nd value TQ2 to 1st value TQ1 (Step ST9). Subsequently, a tenth step determines whether or not upper limit TQmax of output torque of the engine 1 and the motor 2 has become equal to or more than 1st value TQ1 (TQmax≥TQ1) (Step ST10). As a result, if upper limit TQmax of output torque of the engine 1 and the motor 2 is 1st value TQ1 (TQmax=TQ1) (YES), torque limit execution flag is set to F_TQ←0 (Step ST7), torque limit control (or cooperative control) is terminated, and ST8 performs output torque control of the engine 1 and the motor 2 within a range that does not exceed upper limit TQmax=1st value TQ1. On the other hand, if upper limit TQmax of output torque of the engine 1 and the motor 2 is less than 1st value TQ1 (TQmax<TQ1) (NO) in ST10, torque limit control (or cooperative control) is continued, and ST8 performs output torque control of the engine 1 and the motor 2 within a range that does not exceed upper limit TQmax=2nd value TQ2.

In the present embodiment, guaranteed maximum torque of the entire CVT 30 can be used for above-described 1st value TQ1 that is upper limit TQmax of output torque of the engine 1 and the motor 2. Also, a value that is determined based on a preset maximum torque input to the output shaft 10 or the start clutch 11, in other words, a maximum allowable torque that is set based on strength of parts that constitute the output shaft 10 or the start clutch 11, can be used in above described 2nd value TQ2. Thus, by setting upper limit of output torque of the engine 1 and the motor 2 based on a maximum torque of parts of output shaft 10 side, a decrease in power performance of vehicle can be prevented as limit of output torque can be kept to a required minimum.

Also, allowable torque T that is input to the start clutch 11 will be represented, using above-described 1st value TQ1 and 2nd value TQ2, and R0 that is a lowest ratio side value of ratio R (maximum value) (hereinafter referred to as "low end ratio R0"), as follows:

Allowable torque $T = (2nd\ value\ TQ2) \times (low\ end\ ratio\ R0) = (1st\ value\ TQ1) \times (threshold\ value\ R1)$.

Therefore, threshold value R1 of ratio R of the CVT 30 can be set based on ratio of 1st value TQ1 and 2nd value TQ2, and low end ratio R0. More specifically, it will be: threshold R1=(2nd value TQ2)×(low end ratio R0)/(1st value TQ1).

Figure 3:
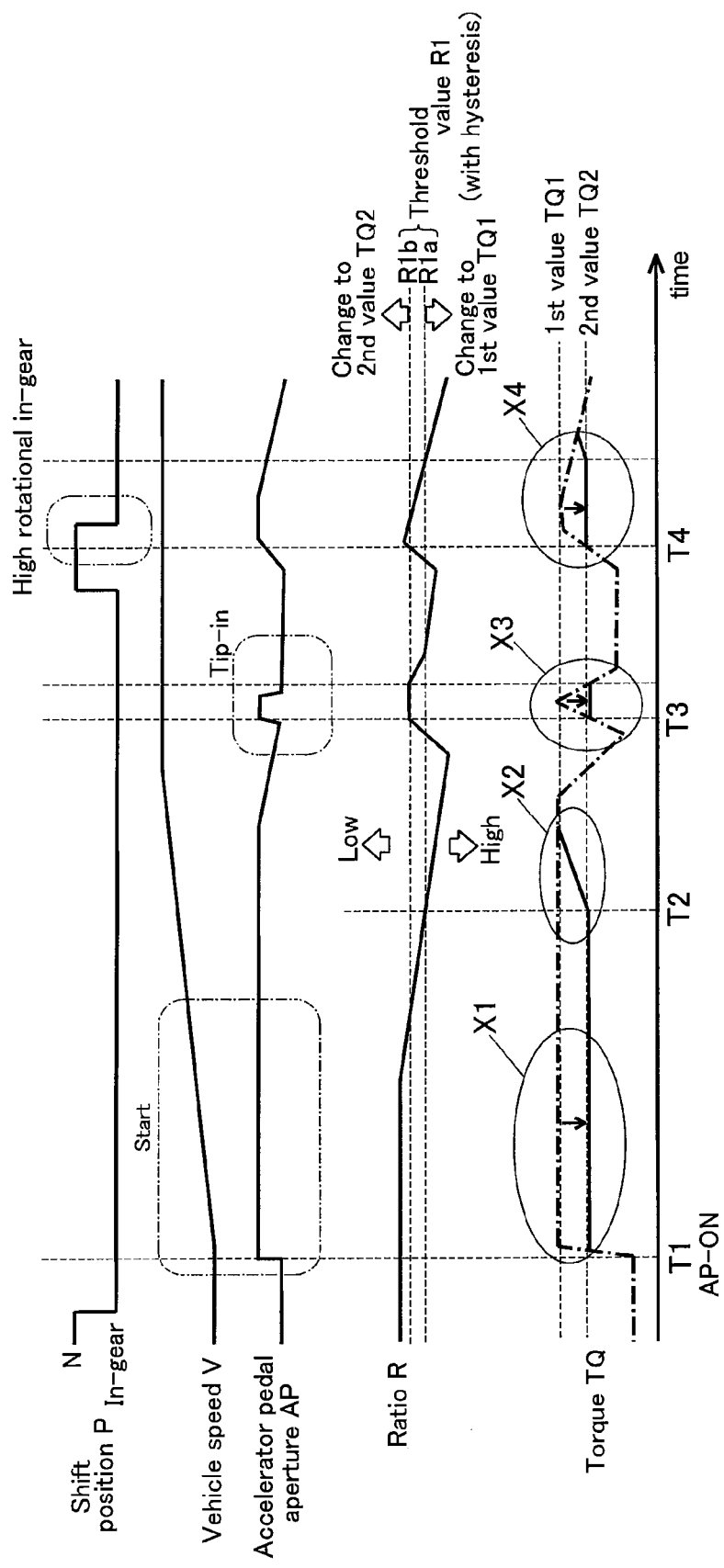
FIG. 3 is a timing chart showing changes of each value when performing torque control of driving source.

Next, a specific example of output torque control of the engine 1 and the motor 2 performed by the above-described procedure will be described in accordance with a graph of FIG. 3. FIG. 3 is a timing chart showing changes of each value when torque control of the engine 1 and the motor 2 is performed. The graph of the same figure shows changes over time of each value of: shift position (in-gear state/neutral state) P detected by the shift position sensor 48; vehicle speed V detected by the output shaft rotation sensor 46; accelerator pedal aperture AP detected by the accelerator pedal aperture sensor 47; ratio R of the CVT 30 calculated based on rotational speed Ndr of the input shaft 7 detected by the input shaft rotation sensor 44 and rotational speed Ndn of the driven shaft 4 detected by the driven shaft rotation sensor 45; and output torque TQ output from the engine 1 and the motor 2 to the input shaft 7.

It is noted that, in the example shown in FIG. 3, hysteresis is added to threshold value R1 of ratio R of the CVT 30. Consequently, threshold value R1 is set such that threshold value R1a when ratio R changes from the low ratio side to the high ratio side is mutually different from threshold value R1b when ratio R changes from the high ratio side to the low ratio side (R1b>R1a). Also, in a graph of torque TQ shown at bottom of the timing chart of FIG. 3, a dash-dot line is a variation when upper limit of torque of the engine 1 and the motor 2 is set to 1st value TQ1, and a solid line is a variation when upper limit of torque of the engine 1 and the motor 2 is set to 2nd value TQ2 (<TQ1).

In the timing chart of FIG. 3, when shift position P is in an in-gear state capable of advancing, vehicle starts by turning on the accelerator pedal at time T1. At that time, since ratio R of the CVT 30 is on a lower ratio side than threshold value R1, upper limit TQmax of output torque TQ of the engine 1 and the motor 2 is set to 2nd value TQ2. Therefore, in this state, as shown in X1 portion of FIG. 3, output torque TQ of the engine and the motor 2 is controlled within a range that does not exceed 2nd value TQ2. This enables to suppress lifetime cumulative load of the start clutch 11 so as to ensure judder toughness of the start clutch 11.

Subsequently, vehicle speed V increases gradually, and ratio R of the CVT 30 changes from low ratio side to high ratio side. Then, at time T2, ratio R of the CVT 30 exceeds threshold value R1 (R1a) from low ratio side to high ratio side. At that time, upper limit TQmax of the output torque TQ of the engine 1 and the motor 2 is restored to 1st value TQ1 from 2nd value TQ2. However, in this case, as shown in X2 portion of FIG. 3, upper limit TQmax of output torque TQ is not restored to 1st value TQ1 from 2nd value TQ2 instantly (or abruptly), but rather gradually changed so as to be proportional to elapsed time with a predetermined slope (DTQ), resulting in restoration to 1st value TQ1. By gradually changing upper limit TQmax of output torque of the engine 1 and the motor 2 for restoration in this manner, occurrence of shocks in the start clutch 11 and occurrence of a jerky feeling in running state of vehicle can be effectively prevented.

Also, even when a so-called tip-in occurs while vehicle is running, ratio R of the CVT 30 may change beyond threshold value R1. Tip-in refers to a phenomenon that, when a accelerator pedal is depressed quickly, throttle aperture increases abruptly due to abrupt increase of accelerator pedal aperture AP, and as a result, torque of the engine 1 increases abruptly, and abrupt increase of the said torque is transmitted to the input shaft 7 to change rotational speed of the output shaft 10 abruptly. In other words, in the graph of FIG. 3, an abrupt change of accelerator pedal aperture AP occurs in a vicinity of time T3. Thus, ratio R of the CVT 30 changes, and the ratio R exceeds threshold value R1 (R1b) from high ratio side to low ratio side. As a result, upper limit TQmax of output torque TQ of the engine 1 and the motor 2 is set to 2nd value TQ2. Therefore, in this state, as shown in X3 portion of FIG. 3, output torque of the engine 1 and the motor 2 is controlled within a range that does not exceed 2nd value TQ2, until ratio R of the CVT 30 subsequently exceeds threshold value R1 (R1a) again from low ratio side to high ratio side. This enables to restrict torque that is input to the start clutch 11, whereby lifetime cumulative load of the start clutch 11 can be suppressed and judder toughness of the start clutch 11 can be ensured.

Further, even when a so-called high rotation in-gear state occurs while vehicle is running, ratio R of the CVT 30 may change beyond threshold value R1. High rotation in-gear here refers to becoming in-gear in a state that the engine 1 and a drive system are in high rotation, in a case such that shift position P is first moved to neutral state and then returned to in-gear, in a running state of vehicle with vehicle speed V above a certain level. In the graph of FIG. 3, shift position P returns to an in-gear state from a neutral state in a vicinity of time T4 while vehicle is running. This changes ratio R of the CVT 30, whereby the ratio R exceeds threshold value R1 (R1b) from high ratio side to low ratio side. As a result, upper limit TQmax of output torque of the engine 1 and the motor 2 is set to 2nd value TQ2. Therefore, in this state, as shown in X4 portion of FIG. 3, output torque of the engine 1 and the motor 2 is controlled within a range that does not exceed 2nd value TQ2, until ratio R of the CVT 30 subsequently exceeds threshold value R1 (Rh) from low ratio side to high ratio side. This enables to restrict torque input to the start clutch 11, which can effectively suppress occurrence of judder (or vibration) in the start clutch 11 to ensure judder toughness of the start clutch 11.

As described above, when ratio R of the CVT 30 is on lower ratio side than predetermined threshold value R1, the torque control device according to the present embodiment performs control to restrict upper limit TQmax of output torque TQ of the engine 1 and the motor 2 to 2nd value TQ2 that is a value smaller than 1st value TQ1 that is upper limit TQmax when ratio R is on higher ratio side than threshold value R1. In other words, torque that is input to the start clutch 11 from the engine 1 and the motor 2 is changed depending on ratio of the CVT 30. As a result, when ratio of the CVT 30 is on a lower ratio side than threshold value, load on the start clutch 11 can be restricted from exceeding a predetermined level. Therefore, occurrence of judder (or vibration) in the start clutch 11 can be effectively suppressed, and judder toughness of the start clutch 11 can be ensured. On the other hand, when ratio of the CVT 30 is on a higher ratio side than threshold value, power performance of vehicle can be improved as driving force of the engine 1 and the motor 2 can be used effectively by releasing torque limit that is input from the engine 1 and the motor 2 to the start clutch 11. Due to this, both of improvement in judder toughness of the start clutch 11 and improvement in power performance of vehicle can be achieved.

Further, in the torque control device of the present embodiment, when ratio R of the CVT 30 exceeds threshold value R1 to change from low ratio side to high ratio side, the main ECU 50 and the engine ECU 51 or the motor ECU 52 that are control means perform control to restore upper limit TQmax of an output torque of the engine 1 and the motor 2 from 2nd value TQ2 to 1st value TQ1. It is noted that upper limit TQmax of the output torque is changed gradually to be restored. By gradually changing upper limit TQmax of output torque of the engine 1 and the motor 2 to be restored in this manner, occurrence of shocks in the start clutch 11 and occurrence of jerky feeling in running state of vehicle can be effectively prevent.

Also, in the torque control device of the present embodiment, threshold value R1 of ratio R of the CVT 30 has hysteresis, and is set to a value such that threshold value R1a when ratio R changes from low ratio side to high ratio side and threshold value R1b when ratio R changes from high ratio side to low ratio side are different from each other. Adding hysteresis to threshold value R1 of ratio R of the CVT 30 in this manner enables to prevent hunting phenomenon that upper limit of output torque of the engine 1 and the motor 2 switches frequently due to changes of ratio R of the CVT 30.

While the embodiment of the invention has been described, it is to be understood that the invention is not limited to the foregoing embodiment. Rather, the invention can be modified to incorporate any number of variations or alterations within the scope of claims and the scope of technical concept described in the specification and the drawings thereof.

The invention claimed is:

1. A torque control device of at least one driving source comprising:
   a vehicle driving device comprising:
   the driving source,
   an input shaft that rotates due to a driving force of the driving source,
   a continuously variable transmission for shifting a rotation of the input shaft and transmitting the rotation to an output shaft; and
   a start clutch arranged between a driven shaft and the output shaft in a torque transmission line of the continuously variable transmission, a rotating shaft installed downstream of the output shaft, the start clutch configured to switch between transmitting and not transmitting the driving force to the output shaft;
   at least one ratio detection means for detecting a ratio of the continuously variable transmission; and
   at least one output torque control means for controlling an output torque of the driving source;
   wherein, when the ratio of the continuously variable transmission detected by the ratio detection means is on a lower ratio side than a predetermined threshold value, the output torque control means performs a control to restrict an upper limit value of the output torque of the driving source to a 2nd value that is smaller than a 1st value that is another upper limit value of the output torque when the ratio is on a higher ratio side than the threshold value, and
   wherein the threshold value of the ratio of the continuously variable transmission is determined based on a ratio between the 1st value and the 2nd value, and based on a value on a lowest ratio side of the ratio of the continuously variable transmission.

2. The torque control device of the driving source as claimed in claim 1:
   wherein, when the ratio of the continuously variable transmission exceeds the threshold value and changes from the low ratio side to the high ratio side, the output torque control means performs control to gradually change the upper limit of the output torque of the driving source and restore the upper limit from the 2nd value to the 1st value.

3. The torque control device of the driving source as claimed in claim 2:
   wherein the 2nd value is determined based on a preset maximum torque input to the output shaft or the start clutch.

4. The torque control device of the driving source as claimed in claim 2:
   wherein the threshold value of the ratio of the continuously variable transmission is set so that the ratio exceeds the threshold value and changes from the lower ratio side to the higher ratio side at a first limit of the threshold value, and the ratio changes from the higher ratio side to the lower ratio side at a second limit of the threshold value.

5. The torque control device of the driving source as claimed in claim 1:

wherein the 2nd value is determined based on a preset maximum torque input to the output shaft or the start clutch.

6. The torque control device of the driving source as claimed in claim 5:

wherein the threshold value of the ratio of the continuously variable transmission is set so that the ratio exceeds the threshold value and changes from the lower ratio side to the higher ratio side at a first limit of the threshold value, and the ratio changes from the higher ratio side to the lower ratio side at a second limit of the threshold value.

7. The torque control device of the driving source as claimed in claim 1:

wherein the threshold value of the ratio of the continuously variable transmission is set so that the ratio exceeds the threshold value and changes from the lower ratio side to the higher ratio side at a first limit of the threshold value, and the ratio changes from the higher ratio side to the lower ratio side at a second limit of the threshold value.

* * * * *